United States Patent [19]
Roseley

[11] Patent Number: 6,050,135
[45] Date of Patent: Apr. 18, 2000

[54] SPARK PLUG PORT COMPRESSION CAP

[76] Inventor: Jean A. Roseley, P.O. Box 460656, Aurora, Colo. 80046

[21] Appl. No.: 08/968,788

[22] Filed: Nov. 12, 1997

Related U.S. Application Data

[63] Continuation-in-part of application No. 08/859,822, Aug. 21, 1997.

[51] Int. Cl.⁷ .................................................. G01M 15/00
[52] U.S. Cl. .................................. 73/116; 73/47; 73/49.7; 73/119 R; 73/120; 33/DIG. 15
[58] Field of Search .............................. 73/47, 49.7, 116, 73/119 R, 120; 33/603, 604, 605, DIG. 15

[56] References Cited

U.S. PATENT DOCUMENTS

| | | |
|---|---|---|
| 1,420,110 | 6/1922 | Kligge . |
| 1,535,688 | 4/1925 | Sauer . |
| 2,011,264 | 8/1935 | Wagner ......................................... 73/47 |
| 2,072,984 | 3/1937 | Haskins .................................... 177/311 |
| 2,098,000 | 11/1937 | Farnsworth et al. . |
| 2,098,058 | 11/1937 | Morgan . |
| 2,386,179 | 10/1945 | Andrus ...................................... 33/172 |
| 2,426,955 | 9/1947 | Stroup ....................................... 33/169 |
| 2,511,392 | 6/1950 | Worel . |
| 2,698,000 | 12/1954 | Rainsbury . |
| 2,747,289 | 5/1956 | Jenkins ...................................... 33/172 |
| 3,979,960 | 9/1976 | Schwartz . |
| 4,263,868 | 4/1981 | Fukui . |
| 4,531,295 | 7/1985 | Saathoff ............................ 33/DIG. 15 |
| 4,928,400 | 5/1990 | Schuh ........................................ 33/605 |

*Primary Examiner*—Eric S. McCall
*Attorney, Agent, or Firm*—Lee G. Meyer; Patton Boggs, LLP

[57] ABSTRACT

The disclosed invention is an inexpensive, simple and reusable device to aid in setting the spark plug timing of an internal combustion engine by allowing one person to detect a piston's top dead center. In function, the detector is sealably inserted into a spark plug port and is forcibly expelled by the pressure maximum that occurs at top dead center. The detector's expulsion is accompanied by a "pop" sound similar to when a champagne cork is expelled from its bottle, and which can be remotely perceived by the user.

14 Claims, 2 Drawing Sheets

SPARK PLUG PORT COMPRESSION CAP

The present application is a Continuation-in-Part of application, Ser. No. 08/859, 822 filed Aug. 21, 1997, for a combustion chamber port compression cap. The parent application, which is incorporated herein, by reference, in its entirety, discloses a device adapted to fit the combustion chamber port of an internal combustion engine, such as the spark plug port of a gasoline engine, for the purpose of locating the top of the number one piston's compression stroke. The device is simple and intended to allow a single person to perform the task of determining top dead center of an internal combustion engine unaided by a second person.

BACKGROUND OF THE INVENTION

1. Field of the Invention

The present invention pertains to an improved detector apparatus and method for a single individual to determine top dead center of an internal combustion engine, such as a gasoline or diesel engine, unaided by a second person. The detector device is adapted to be sealably retained in the combustion port of an engine to seal the chamber. The device indicates that the piston has achieved top dead center by being audibly expelled from the port by the pressure exerted on the device when the piston reaches top dead center.

The present invention relates generally to remote determination of the dead center position of the piston in an internal combustion engine.

2. Description of Related Art

The inspection and adjustment of the valve clearance in an internal combustion engine is very important, particularly with regard to environmental pollution which is caused by exhaust gasses. Moreover, the inspection and adjusting of the valve clearance has in the past required a considerable amount of time and labor, and has had to be performed by persons, skilled in this particular area, and usually by more than one person. Likewise, adjustment of an gasoline engine's ignition spark is a crucial step in maximizing the engine's power output and efficiency, while minimizing exhaust pollutants. When an engine's spark is properly set, the engine pollutes less and operates at peak efficiency.

The ignition timing is easily adjusted by appropriate manipulation of the engine's distributor, and such adjustment is one typically undertaken by the home mechanic. Ignition timing is determined by reference to the linear position of a chosen piston, usually the number one, piston in its stroke. The top of the piston's compression stroke is the highest point in its cycle relative to the spark plug and is called "top dead center."

Both of the above described adjustments require determining when the piston is at "top dead center." In order to detect when the piston is at top dead center, a crank lever has traditionally been rotated by hand, so that the person performing the function could observe when the number one piston was at top dead center. However, since modern automobiles are in most cases equipped with a cooling pump, a power steering pump, a supercharger and the like in the engine compartment, the above-described cranking operation becomes very difficult because of the small amount of space remaining in the engine compartment. Moreover, the above-described equipment is connected to the crank shaft so that, in trying to rotate the crank shaft by hand, a great amount of force is required and frequently results in the person turning the crank injuring himself due to slipping of his hand. In high compression gasoline engines this is impossible unless all the spark plugs are removed. Diesel engines normally can not be hand cranked at all.

Because top dead center occurs at the end of the piston's compression stroke, top dead center in the combustion chamber is accompanied by a maximization of the pressure within the chamber. After establishing top dead center, ignition timing is indicated in degrees before or after top dead center. Thus, the first step in adjusting ignition or vavle timing is to rotate the engine crankshaft and determine the point of the piston's closest approach to the spark plug or top dead center. However, as indicated above, rotating the crankshaft of a modem engine requires more force than a person can practically generate, and so engine rotation is usually done by actuating the electric starter motor with the ignition switch. Therefore, measuring top dead center traditionally requires two people, one to operate the starter switch, and one in the engine compartment to measure piston position. Various devices for measuring top dead center are found in the art.

U.S. Pat. No. 1,535,688 teaches a device to measure the pressure in a combustion chamber and thereby indicate top dead center. This device measures the combustion chamber pressure by means of a guage inserted into the spark plug port. One embodiment visually indicates top dead center by measuring the pressure maximum in the sealed combustion chamber through a flexible diaphragm mechanically attached to an indicator needle. Another embodiment audibly indicates top dead center on an unsealed chamber via a pair of whistles, one which is actuated by the compression leading up to top dead center and the other which is actuated by the suction following top dead center. The embodiment with the gauge requires a delicate and precision mechanism to measure top dead center, and the embodiment with the whistles is a complicated and expensive apparatus.

U.S. Pat. No. 2,098,058 reveals a mechanism to visually indicate top dead center by measuring the pressure maximum in the sealed combustion chamber with a manometer through a spark plug port. The manometer mechanism is fragile and requires various pressure release valves to protect against its damage.

U.S. Pat. No. 2,511,392 demonstrates an instrument which visually indicates top dead center by illuminating a light bulb through an electrical connection between the piston and a slidable rod. The slidable rod is mounted in the spark plug port, and protrudes into the combustion chamber. Upon the compression stroke, the piston makes contact with the rod and pushes it out of the chamber, leaving it at the maximum extent of piston travel. With the rod tip located at maximum piston ascent, the piston makes contact with it only at top dead center and completes the light bulb's electrical circuit on subsequent crankshaft rotations. This device requires a precision sliding surface between the slidable rod and the spark plug port mount, which is expensive to manufacture. This device also requires two people.

U.S. Pat. No. 4,263,868 shows a top dead center detector which comprises an air check-valve mounted in the combustion chamber's spark plug port. As the piston ascends to top dead center, the check valve opens and vents the chamber. When the piston continues past top dead center, the valve closes and seals the chamber. With the chamber sealed, the piston's descent past top dead center is halted by the vacuum thus created. This type of detector is necessarily inaccurate because the vacuum is created by the piston's descent, and so the piston must move substantially past top dead center before a vacuum sufficient to stop the piston is created.

Thus it would be advantageous to have a simple, inexpensive device that could be used by one person to accurately determine top dead center; could be manufactured at a low cost, is light weight, small and of simple construction; would be capable of easily detecting when the piston of an automobile engine is at the top dead center position; and would allow easy perception of the top dead center position of the piston of an automobile engine.

SUMMARY OF THE INVENTION

It has now been unexpectedly discovered that the deficiencies of the prior art devices can be overcome by an accurate, simple mechanism, which is easily and inexpensively manufactured, and allows a single individual to measure the top dead center position of a piston in an internal combustion engine. The contemplated device seals a spark plug port to form a pressure vessel inside the combustion chamber so that as the pressure in the chamber increases, as the piston arrives at top dead center, the device is dislodged and expelled with an audible sound.

In the present invention the top dead center position of a piston is detected by a device, having a substantially cylindrical base portion and adapted to be sealably received into the threaded ignition plug port of the cylinder. The piston is caused to ascend within the chamber by operation of a starter switch in an intermittent manner so that the pressure within the combustion chamber expels the device from the spark plug port with an audible sound as the piston attains top dead center. Because top dead center is audibly indicated, a person turning the crankshaft of the engine need not see the device to know that the piston has reached its maximum ascent. Thus, one person can find top dead center by turning the crankshaft and listening for the appropriate sound.

In the broad aspect the detector device contains a substantially cylindrical elongated portion adapted to be sealably inserted into the spark plug port, and a shoulder portion of larger diameter adapted to rest on the exterior of the port. In one embodiment the device contains opposing cylindrical elongated portions of differing diameters to accommodate the two standard sized plug ports of 14 mm and 18 mm. Attached to the device is a tether to prevent it from being lost when it is expelled. The end of the device to be inserted into the port is sufficiently elastic and resilient, and of suitable diameter, so that when inserted, the detector is held snugly and provides a seal for the combustion chamber.

In operation, the inserted detector device provides a seal for the combustion chamber such that the coefficient of friction between the port wall and the elongated cylindrical portion of the device is sufficient to provide a combustion chamber seal until the piston reaches top dead center. When the piston reaches top dead center, the pressure in the chamber is sufficient to overcome the coefficient of friction holding the detector in the port, and the detector is expelled under pressure from the port. The detector's sudden pressured expulsion from the port is accompanied by a loud "pop" sound. The tether restrains the ejected device so that it can be located.

DESCRIPTION OF THE PREFERRED EMBODIMENTS

Figure 1:
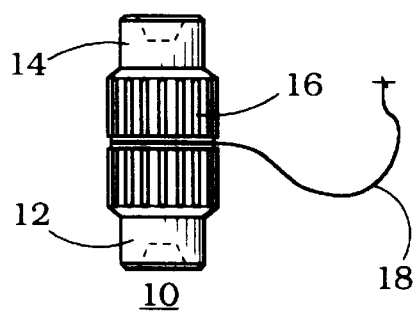
FIG. 1 is a perspective view of one embodiment of the device of the invention.
Figure 2:
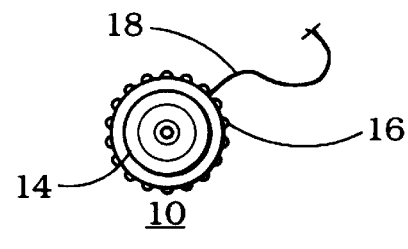
FIG. 2 is an top view of the embodiment of the device shown in FIG. 1.

Referring to FIG. 1 there is shown the detector device assembly of the instant invention referenced generally as numeral 10. The assembly 10 comprises an elongated cylindrical base portion 12 of an outside diameter adapted to fit a 14 mm spark plug port; and, an opposed elongated cylindrical base portion 14 of an outside diameter adapted to fit a 18 mm port. The portions 12 and 14 communicate on their respective ends with a center grooved portion 16. As better seen in FIG. 2, the center grooved portion 16 is of a slightly larger diameter than the base portion 14 (or 12 not shown). Each of the base portions 12 and 14 is of suitable outside diameter to provide an interference fit when inserted into a spark plug port to create a sealed barrier in the port. The central section 16 is knurled or otherwise textured to enhance the gripping characteristics of this section to facilitate insertion of one of the base portions 12 or 14 into a spark plug port. Central section 16 is of a sufficiently larger diameter, than either base portion 12 or 14 to prevent the device 10 from being entirely inserted into the port.

A tether 18 is fixedly attached to, for example, the center portion of device 10. The tether 18 is adapted to be fastened to a portion of the vehicle, for example, the engine to prevent loss of the device after it is forceably expelled. This tether can be made of any flexible, durable material and preferably is resistant to the chemical and thermal environment found near internal combustion engines.

Figure 4:
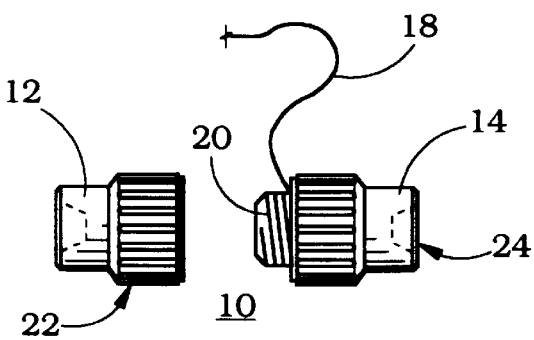
FIG. 4 is an exploded view of the device shown in FIG. 1.

As shown in FIG. 4, in a preferred aspect, the device 10 is segmented into two substantially equal portions, 22 and 24 designed and adapted to be fastened together by means of a threaded fastening means. Portion 24 carries a male threaded portion 20, which threadedly engages a like threaded female portion (not shown) in portion 22.

Figure 3:
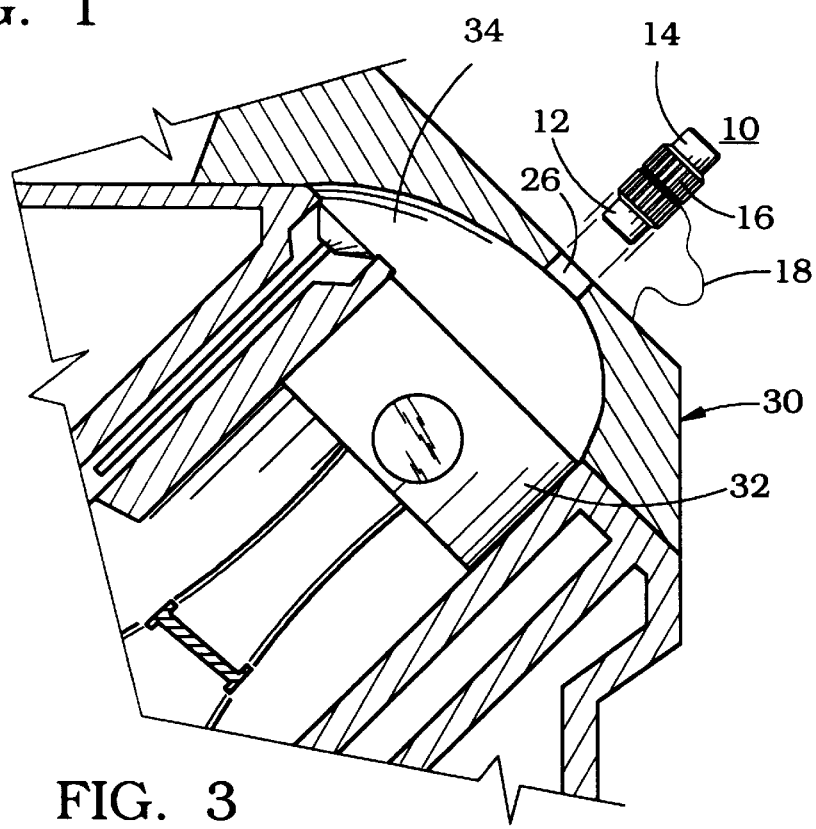
FIG. 3 is a cross-sectional view of an internal combustion engine showing the device of the invention as it is expelled from a spark plug port.

As shown in FIG. 3, engine 30 is of a conventional configuration having a piston 32 and a chamber 34 and a spark plug port 26. In operation, the assembly 10 is grasped by center grooved portion 16 and one of the base portions 12 or 14 is inserted into a spark plug port 26 of the engine 30. As the piston reaches top dead center as shown in FIG. 3, the assembly 10 is forcibly expelled. Tether 18 which has been previously attached to the engine 30 restrains the assembly 10.

Figure 5:
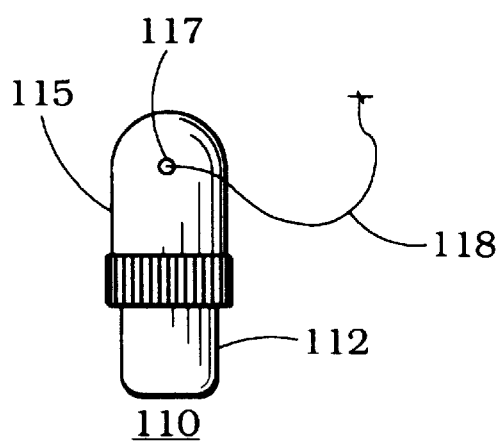
FIG. 5 is a perspective view of another embodiment of the device of the invention.
Figure 6:
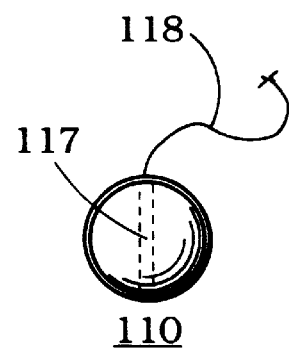
FIG. 6 is a top view of the embodiment of the invention shown in FIG. 5.
Figure 7:
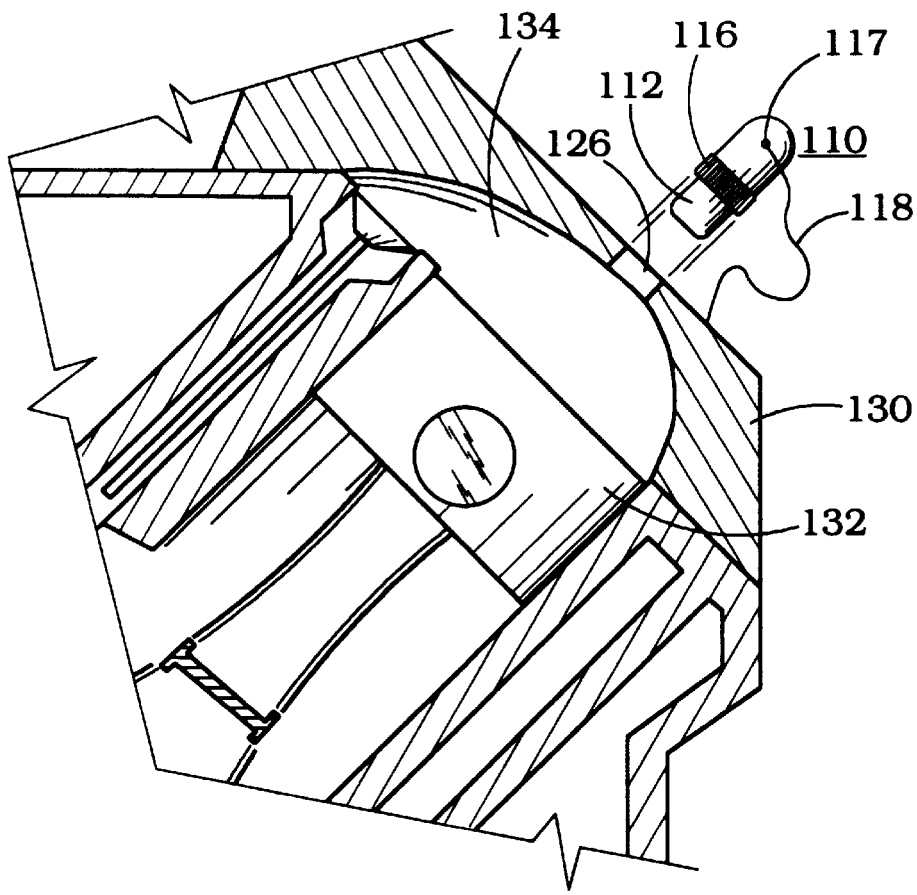
FIG. 7 is a cross-sectional view of an internal combustion engine with the embodiment of the invention as shown in FIG. 5 as it is expelled from a spark plug port.

FIGS. 5, 6 and 7 show a single port detector embodiment 110 of the instant invention. The single port detector consists of a cylindrical base member 112 attached to a roughened, knurled, or otherwise textured cylindrical central member 116. The cylindrical base member is of suitable diameter to create an interference fit when inserted into a spark plug port. The central member is of larger diameter than the base member to prevent the detector from being entirely inserted into a port. A domed top member 115, having a circumference substantially the same as the central member 116, is fixed to the central member 116 or through the top member 115 is an eyelet 117 through which the tether 118 is inserted.

FIG. 6 shows the devise 110 with the eyelet 117 in phantom.

In a manner similar to FIG. 3, FIG. 7 shows the single port detector 110 being ejected from a spark plug port 126. This cross sectional view of the engine 130 shows a combustion chamber 134 and a piston 132 at top dead center. Also visible is the tether 118 attached to the cylinder head of engine 130.

Thus, the detector device is inserted into the appropriate sized port with gentle finger pressure, and when inserted is slightly compressed around its outer circumference and thereby exerts pressure against the inside diameter of the port. The pressure is sufficient to seal the detector into the port, with the seal being formed between the outer diameter of the detector base portion and the inner diameter of the port. This sealing pressure is also sufficient to hold the detector in the port against the pressure created by the ascent of the piston until top dead center is achived. However, the detector's sealing pressure is insufficient to withstand the pressure maximum which coincides with top dead center, and thereby allows the detector to be suddenly expelled when the piston reaches its maximum ascent.

Those skilled in the art will realize that the disclosed invention may be modified or altered in various ways to function in internal combustion engines other than gasoline such as diesel or propane, and still be within the scope of the invention. The detector need not necessarily function in a spark plug port, but may function in any orifice which communicates with the combustion chamber of any engine type. For example, both the dual port and single port detector may be altered to function in diesel engines through the glow plug, or other, port.

What is claimed is:

1. A device for determining the top dead center position of a piston in a combustion chamber having a combustion chamber port in an internal combustion engine comprising:

a cylindrical base member having an outside diameter of suitable dimensions to form an interference fit with an inside diameter of said combustion chamber port; and a cylindrical shoulder member disposed above said base member having an outside diameter greater than the combustion chamber port and adapted to prevent insertion of the device entirely into the combustion chamber, said base member having an outside diameter such that the device is ejected from said chamber port at a pressure equal to that present in the combustion chamber at the top dead center position of the piston in said combustion chamber.

2. The device of claim 1 wherein said combustion chamber port is a spark plug port.

3. The device of claim 2 wherein said base member is of an outside diameter to fit a 14 mm spark plug port.

4. The device of claim 2 wherein said base member is of an outside diameter to fit a 18 mm spark plug port.

5. A device of claim 1 further comprising tether means, attached to said device, for restraining said device when the device is ejected from said port.

6. A device for determining the top dead center position of a piston in a combustion chamber having a combustion chamber port in an internal combustion engine comprising:

an elastic and resilient base member of suitable outside diameter to be inserted sealably and frictionally into a spark plug port wherein sufficient friction exists between said outside diameter of the base member and the inside diameter of said port to withstand the pressure generated by the ascent of the piston up to the top dead center, but said friction is insufficient to retain the member in said combustion chamber port when the piston achieves top dead center.

7. The device of claim 6 wherein said base member is of an outside diameter to fit a 14 mm spark plug port.

8. The device of claim 6 wherein said base member is of an outside diameter to fit a 18 mm spark plug port.

9. A device of claim 6 further comprising tether means, attached to said device, for restraining said device when the device is ejected from said combustion chamber port.

10. A method for remotely measuring the top dead center position of a piston in a combustion chamber having a combustion chamber port in an internal combustion engine comprising:

sealing the combustion chamber port said internal combustion against pressure created by the ascent of said piston until said piston reaches top dead center by means of an elastic and resilient base member of suitable outside diameter to be inserted sealably and frictionally into said port wherein sufficient friction exists between said outside diameter of the base member and the inside diameter of said port to withstand the pressure generated by the ascent of the piston up to the top dead center, but said friction is insufficient to retain the member in said port when the piston achieves top dead center; and audibly expelling said elastic and resilient member by means of pressure generated by said piston when the piston reaches top dead center.

11. The method for remotely measuring top dead center of claim 10 wherein said port is a spark plug port.

12. The method for remotely measuring top dead center of claim 11 wherein said base member is of an outside diameter to fit a 14 mm spark plug port.

13. The method for remotely measuring top dead center of claim 11 wherein said base member is of an outside diameter to fit a 18 mm spark plug port.

14. The method for remotely measuring top dead center of claim 10 further comprising attaching a tether means to said base member for restraining said member when the base member is expelled.

* * * * *